Oct. 6, 1925.
T. MIDGLEY
1,556,295
DEVICE FOR EXPANDING ENDLESS BANDS
Filed April 23, 1921
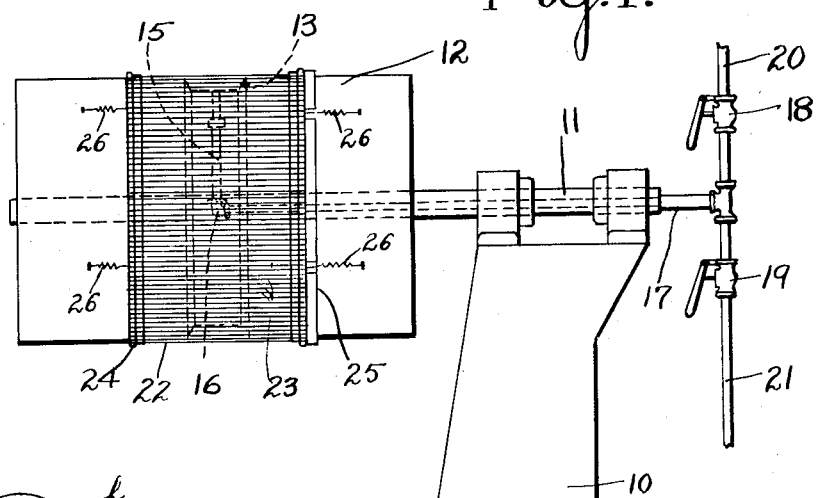
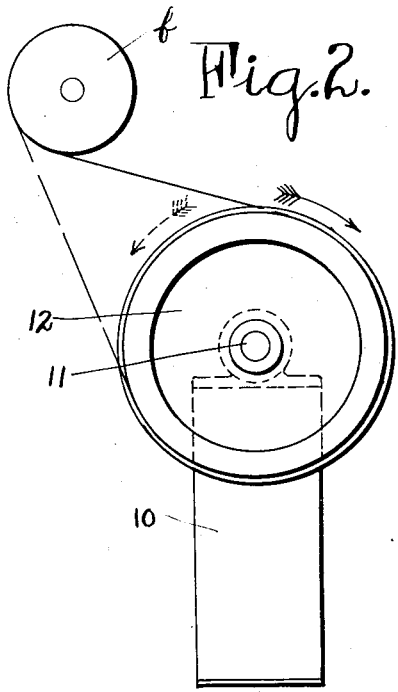
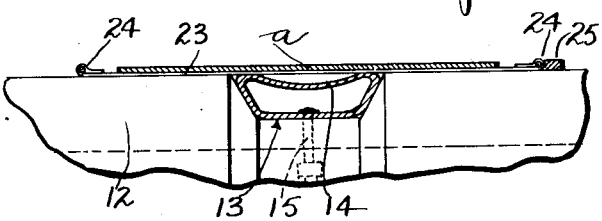
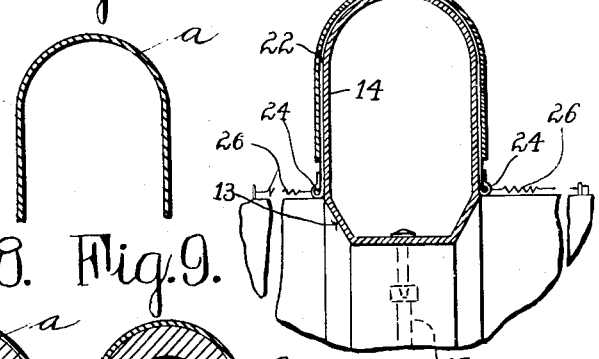
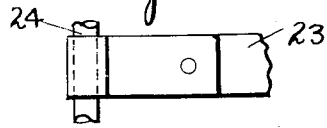
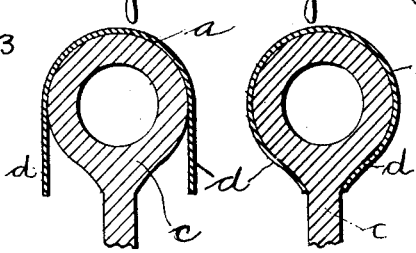
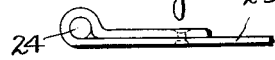
INVENTOR
Thomas Midgley.
BY
Edward C Taylor
ATTORNEY Patented Oct. 6, 1925.

1,556,295

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSFTTS.

DEVICE FOR EXPANDING ENDLESS BANDS.

Application filed April 23, 1921. Serial No. 463,993.

*To all whom it may concern:*

Be it known that I, THOMAS MIDGLEY, a citizen of the United States of America, residing at Hampden, in the county of Hampden and State of Massachusetts, have invented certain new and useful Improvements in Devices for Expanding Endless Bands, of which the following is a specification.

This invention relates to the forming and expanding of endless bands, particularly such as are used in forming the carcass portions of automobile tire casings. It has for one object a method and an apparatus by which endless bands of carcass-forming material may be formed in an expeditious manner. It has for another object a device which will expand an endless band of carcass-forming material into substantially the form in which such band is to be placed on the former and which will at the same time prevent too great expansion of the band. It has for a further object an apparatus which is adapted to serve both as a means for forming the band and as means for expanding it into a suitable shape for being placed upon a tire-building former. My invention will now be described with particular reference to the accompanying drawings, in which—

Fig. 1 is a side elevation of the apparatus forming a part of my invention;

Fig. 2 is an end view of the apparatus shown in Fig. 1 illustrating one manner in which the expanding apparatus may itself be used in forming endless bands;

Fig. 3 is a partial longitudinal section of the expanding apparatus shown in Fig. 1;

Fig. 4 is a view similar to Fig. 3 showing the band expanded;

Figs. 5 and 6 are details of certain flexible strips used in limiting the expansion;

Fig. 7 shows the expanded band in section;

Fig. 8 shows this band applied to a tire building former; and

Fig. 9 shows the band shaped against the sides of the former in its final position.

In the drawings, which illustrate the embodiment of the invention at present preferred, 10 represents a standard in which the shaft 11 is pivoted. Secured to this shaft is a drum 12 having a tube receiving groove 13 extending circumferentially thereof. An expansible member 14, which may be similar to the ordinary inner tube used in tire casings, is located in this groove and is provided with a connection 15 connected by a suitable swivel joint 16 to a pipe 17. This pipe is connected through valves 18 and 19 with a source of fluid pressure 20 and an exhaust pipe 21, preferably leading to a device for maintaining a partial vacuum. Extending across the tube receiving groove 13 is a flexible jacket denoted generally by 22. This jacket is shown as composed of a plurality of flexible strips 23 secured at their ends to annular members or rings 24. These strips 23 are arranged so as to form a substantially circumferentially complete series around the drum. They are preferably constructed out of some flexible but substantially non-extensible material such as spring steel. Rings 24 are free to slide on the surface of the drum so that when the tube is inflated they will shift from the position of Fig. 3 to that of Fig. 4. To aid in positioning this flexible jacket on the drum a flange 25 is provided. If desired, connections such as springs 26 (shown only in Figs. 1 and 4) or suitable handles may be made to rings 24 so that they may be readily moved from the position of Fig. 4 back to that of Fig. 3.

Referring now to the operation of the device, the endless band *a* of carcass forming material is mounted on the outer surface of the flexible jacket while the latter is in the position of Figs. 1 and 3. This band may be formed elsewhere and merely placed in position about the jacket or it may be formed directly on the jacket from a spool of material *b*, Fig. 2. The latter method of forming the band has the advantage of avoiding the necessity of extra equipment, and to that end I have designed the expanding unit so that it at the same time serves to present a flat surface acting as a support for the formation of the band and as an expanding device for operation upon the formed band. It is usually desirable to have the band constructed of a pair of plies of material with their strain resisting members disposed in opposite directions. One ply of material may be formed by drawing the material from spool *b* on to the drum while the latter is rotating in the direction of the full line arrow in Fig. 2, and the second ply by drawing the material onto the drum as shown in dotted lines, the drum in this case being rotated in the direction of the dotted arrow.

It will be seen that during the steps of forming the endless band the jacket 22 bridges the tube receiving groove 13 and presents a flat surface upon which the fabric may be accurately laid. After the band has been placed upon the drum in the position of Fig. 3 the tube 14 is inflated, causing the band to be stretched into the position of Fig. 4, rings 24 moving together to permit of this motion. The tube is then deflated and the band, which now has a shape substantially like that shown in Fig. 7 in transverse section, is removed and placed upon a former $c$, Fig. 8. It will be seen that the band is substantially shaped to the former at the time it is placed thereon and that all that remains to be done to complete its shaping is to press the depending side portions $d$ of the band against the side of the former.

The function of the jacket 22 in the expanding process is twofold. In the first place it reduces the friction between the endless band to be stretched and the tube 14 so that the band will take more nearly the shape natural to it under expansion. In the second place it will limit the expansion of the tube so that an excessive amount of stretch cannot be given but all portions of the band will receive a uniform expansion. In the absence of this jacket the inflation of the tube must be watched with great care to avoid excessive stretch.

Having thus described my invention I claim:

1. In a device of the class described, an inflatable tube adapted to expand an endless band from the flat to substantially the cross-sectional form of a tire, and a flexible jacket arranged over the tube and adapted to partake of its movement from the flat to tire form and to limit the expansion thereof.

2. In a device of the class described, an inflatable tube, and a plurality of flexible bands disposed across the tube and secured at their ends to substantially inextensible members.

3. In a device of the class described, a drum having an annular tube receiving groove, an inflatable tube mounted therein, a pair of annular members slidably mounted on said drum, one on each side of said groove, and a circumferential series of flexible but substantially inextensible bands secured at their ends to said annular members and extending across said groove.

4. In a device of the class described, a drum having an annular tube receiving groove, an inflatable tube mounted therein, a flexible jacket arranged across said groove and over said tube, and means tending to separate the edges of the jacket.

5. An expansible and contractible former for use in tire building comprising a circular support for tire material, said support being composed of simultaneously movable sections, and means to expand the support to approximate tire shape or contract it to a substantially flat form.

6. In a device of the class described, a plurality of flexible bands arranged about a circumference and having their end portions secured in a given circumference, and means for acting upon the bands to bow them outwardly between their ends.

THOMAS MIDGLEY.